United States Patent Office 3,328,522
Patented June 27, 1967

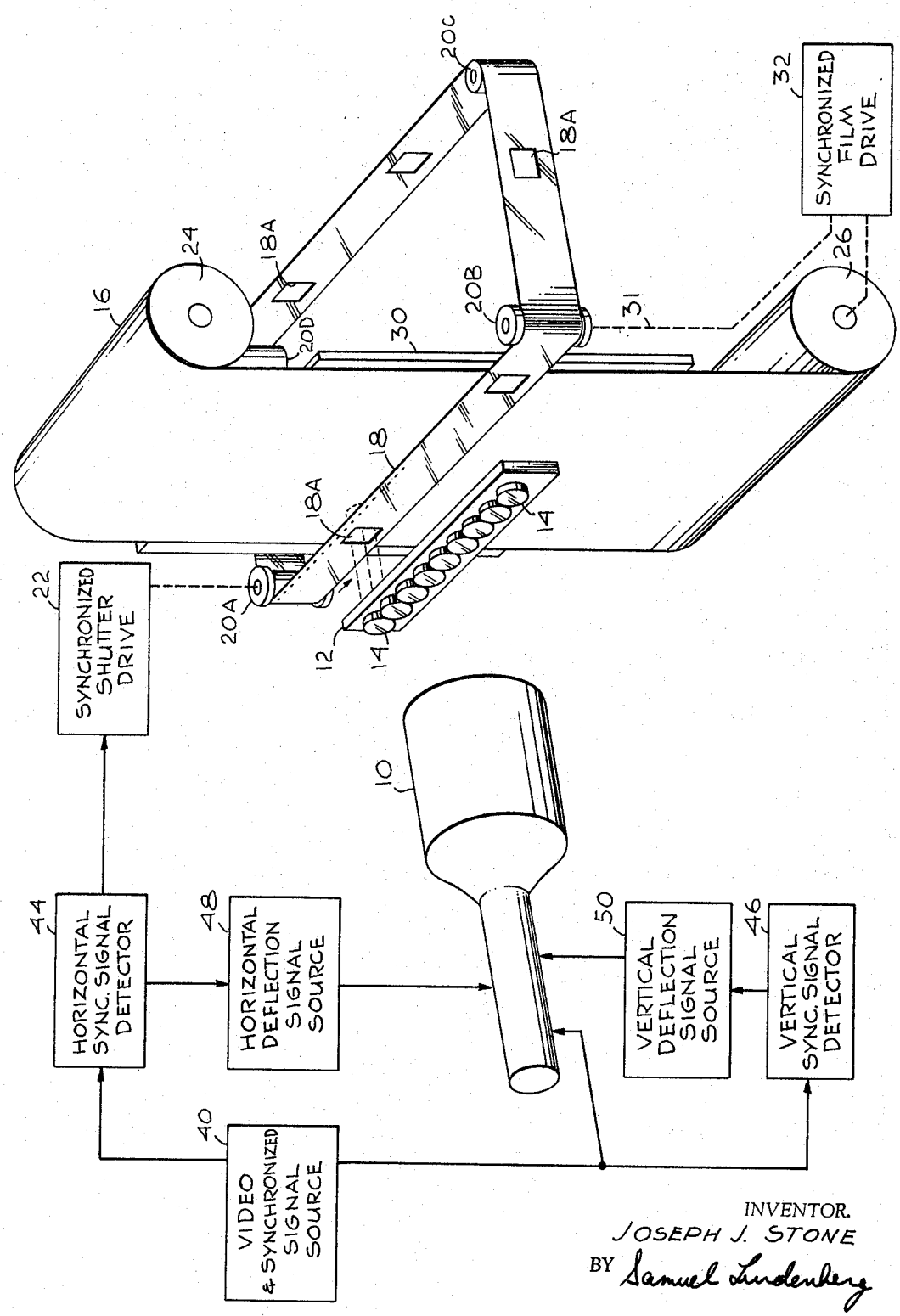

3,328,522
PHOTOGRAPHIC RECORDER HAVING MULTIPLE LENSES FOR SEQUENTIAL EXPOSURE
Joseph J. Stone, Glenview, Ill., assignor to A. B. Dick Company, Chicago, Ill., a corporation of Illinois
Filed Jan. 28, 1964, Ser. No. 340,686
7 Claims. (Cl. 178—6.7)

This invention relates to apparatus for recording images which are displayed by display apparatus, such as a cathode ray tube, and more particularly to improvements therein.

One of the present day methods of recording the output of a high speed source of data such as a computer, is to convert such data into video signals which are then displayed across the face of a high speed display device such as a cathode ray tube. The cathode ray tube face is then photographed either by using xerographic techniques or by using a camera with a single imaging lens. Where graphic arts quality is desired, the single imaging lens technique is employed. However in order to really achieve graphic arts quality for, for example, an 8½ inch wide recording from the face of a tube with a single imaging lens, a cathode ray tube having a four thousand line resolution is required. Tubes having this type of resolution are expensive, difficult to adjust and maintain. Furthermore, for taking the photograph of the face of a tube of this size, a long focal length lens is necessary. These lenses are limited in speed and thus require the use of expensive high speed film or a longer exposure for the slower speed films which effectively slows down the recording processes.

An object of this invention is to provide a data recording system which enables the use of commercially available and relatively inexpensive components.

Still another object of the present invention is the provision of a recording system whereby shorter focal length lenses which afford higher operating speed, may be employed.

Yet another object of the present invention is the provision of a novel and useful system for enabling the recording of images displayed on a cathode ray tube with graphic arts quality.

These and other objects of the invention may be achieved by using a camera such that the image produced on a display device such as a cathode ray tube is permitted to illuminate an in-line array of lenses of that camera. Behind the array of lenses there is a focal plane shutter with a slit therein and behind the focal plane shutter is a sensitized emulsion such as film. The slit of the focal plane shutter limits the image received by the film to that being produced by single lens. The lenses are placed adjacent to one another spaced from the film so that images produced on a film from adjacent lenses will be exactly adjacent one another. The focal plane shutter moves along the line of lenses so that each lens in turn is permitted to transmit an image to the film behind the shutter.

In use the cathode ray tube displays a line of data in successive portions or segments of a line with a segment being spread across the width of the tube display area. Light from each one of the images displayed on the cathode ray tube face is passed through every one of the lenses, but only the lens behind which the shutter slit is positioned will transmit these images to the film. The motion of the shutter is synchronized with the cathode ray tube display so that a line of alphanumeric characters is displayed across the face of the tube in the interval during which the shutter slit is behind a single lens. At the end of that line the shutter slit proceeds to open the adjacent lens as the next line segment of alphanumeric characters is created across the face of the cathode ray tube. If the lenses are such as to have a magnification ratio, a cathode ray tube having say the standard 700 line resolution can provide the quality of a 4000 line resolution cathode ray tube using techniques of this invention.

The novel features that are considered characteristic of this invention are set forth with particularity in the appended claims. The invention itself both as to its organization and method of operation, as well as additional objects and advantages thereof, will best be understood from the following description, when read in connection with the accompanying drawing, which comprises a schematic isometric view of an embodiment of the invention.

Referring now to the drawing, a display type of cathode ray tube 10 is represented schematically. The cathode ray tube is positioned so that images which are displayed on the face thereof are exposed to an array of lenses 12. By way of example and not by way of limitation nine lensse 14 are shown each of which can produce an independent image of the cathode ray tube face on film 16 positioned behind lens array 12. A focal plane slit shutter 18 limits the images received by the film to that being produced by a single lens. The focal plane slit shutter 18 may be supported by four rollers 20A, 20B, 20C, and 20D. One of these rollers 20A is driven by a synchronized shutter drive motor 22. The shutter has more than one slit 18A therein so that the operation thereof may be continuous. The film 16 which is behind the shutter is unrolled from a payoff reel 24 passes the shutter and is taken up on a takeup reel 26. A backup plate 30 maintains the film flat and in the focal plane of the lenses 14. A synchronized film drive motor 32 in response to the focal plane shutter slit having traversed the lens array operates to advance the film to expose a new line of film to the lenses 14.

The cathode ray tube 10 has applied thereto, in well known manner, video and sync signals from a video and sync signal source 40. The video and sync signal source provides not only the video signals but also both horizontal and vertical sync signals.

For the purposes of this invention, a complete line of data is divided into nine segments. The nine segments are displayed across the face of the cathode ray tube in sequence. A line is divided here into nine segments because of the fact that each one of the nine lenses 14 photographs only a single line segment on the film. The provision of video and sync signals is well known in the television art, therefore the details of this need not be described here.

The output of the horizontal sync signal detector consisting of horizontal sync signals is applied to the horizontal deflection signal source 48 for the purpose of synchronizing the horizontal deflection signals. The output of the horizontal deflection source 48 is applied to the cathode ray tube 10 in well known manner, for the purpose of deflecting the cathode ray beam horizontally across a line of the tube to provide a horizontal display of a line segment. The vertical sync signal detector 46 applies its output to the vertical deflection source 50 for the purpose of synchronizing vertical deflection signals.

Vertical deflection signals are applied from the source 50 to the cathode ray tube in well known manner for deflecting the cathode ray beam vertically with the proper timing. The output signals from the horizontal sync detector 44 are also applied to the synchronous shutter drive 22 for the purpose of advancing the shutter slit successively from lens to lens as successive line segments are completed. The synchronous advance of the shutter is used to signal the synchronous film drive 32 to advance the film after a line has been exposed.

In operation, the images of the cathode ray tube are produced by a television like raster with a higher speed scanning in a vertical direction perpendicular to the line of the lenses. The video signals cause a light image of alphanumerical characters to be created in the horizontal direction parallel to the line of lenses. Thus, characters are displayed on the cathode ray tube face sequentially from left to right. These characters, in the image formed on the film, appear sequentially from left to right. The cathode ray tube image is provided with sufficient horizontal width to permit for example a formation of one inch wide image through each lens on the film. A set of nine lenses can then provide a total coverage of the film of 9 inches if the lenses are adjusted so that the edges of each image join. The first image is formed on the left edge of the film 16 (it assumed that the cathode ray tube is observed facing it and the film image plane is observed from the lens side).

The focal plane shutter is positioned so that the image of the first lens is formed on the film. At a steady rate the display is created on the cathode ray tube face progressively from left to right in synchronization with the movement of the shutter so that the shutter follows the image on the film being created by the first lens. At the conclusion of the first display cycle, the cathode ray tube image is being created along its right hand edge and the image passing through the focal plane shutter appears on the right hand edge of the first lens image. The next display cycle then starts on the left edge of the cathode ray tube causing the image of the first lens to be reset to the extreme left edge of the film. At this time however the image of lens No. 1 is blocked by the focal plane shutter. The image from lens No. 2 which has switched to the left hand edge of lens No. 2 can pass through the shutter slit to the film. This sequence is continued, with the image from each lens successively being used to expose the film until the entire line has been exposed.

It should be appreciated that, at any one time, a complete display on the face of the cathode ray tube comprises a segment of a line. When all of the line segments which complete a line have been exposed and recorded on the film 16 the shutter roller 20B, which rotates with the shutter, through a shaft coupling 31, energizes the synchronized film drive 32 to move the film and present a fresh unexposed line of film behind the shutter 18. The synchronized film drive 32 may comprise a cam operated advancing mechanism, or a rotary solenoid operated by a contact closure operated in turn by the shaft 31. By way of example, and not to be construed as a limitation upon the invention, a 5 inch cathode ray display tube was employed with a 700 line resolution. An area of approximately 4 inches in width and one inch in height in the center of the display tube was used to display the information which was to be recorded. Nine lenses were used in the lens array each providing a magnification ratio of approximately 3 to 1. The lenses were approximately 1 inch in diameter and had an F2 focal length. They were positioned to image the displayed information across a 9 inch wide path of the film transport system. The lens were accurately positioned so that their fields of vision on the displayed line comprised slightly overlapping segments approximately 1 inch in width across the image area. Through the use of the multiple lens system, the problem of maintaining alignment of the system is reduced to the relatively simple one time operation of setting the optical system. Thereby the need for complex and repeated electronic adjustments is eliminated.

There has accordingly been described and shown herein a novel useful and relatively inexpensive arrangement for achieving graphic arts quality in the reproduction of data displayed on the face of a relatively inexpensive display device. While the shutter and lens arrangement described uses a focal plane shutter, it is well within the skill of those versed in the art to use between the lens shutters which may be successively triggered upon the presentation of successive complete line segment displays. It is to be understood therefore that this and other such arrangements come within the scope of the claims herein.

I claim:

1. In a system for photographing data displayed in sequential segments across the face of a display device, the improvement comprising a camera having a plurality of adjacent lenses, a sensitized emulsion positioned to receive illumination from images of the face of said display device produced adjacent to one another by said adjacent lenses, and shutter means for successively unblocking said plurality of lenses for enabling the images established by said successive lenses to successively reach said sensitized emulsion.

2. A system for recording on a sensitized emulsion an image displayed on the face of a cathode ray tube comprising a camera having a plurality of lenses positioned adjacent to one another and positioned in front of said cathode ray tube face for each lens to produce an image of said cathode ray tube face, said sensitized emulsion being positioned behind said lenses to record adjacent one another said images formed by said plurality of adjacent lenses, shutter means for successively exposing each of said lenses to said sensitized emulsion, and means for advancing said sensitized emulsion to provide an unexposed area thereof to said plurality of lenses after the last of said lenses has been exposed to said sensitized emulsion.

3. A system as recited in claim 2 wherein said shutter means comprises a focal plane shutter having a slit therein sized to expose the image of one lens to said sensitized emulsion, and means for moving said focal plane shutter to move said slit successively past said adjacent lenses.

4. Apparatus for recording images displayed on the face of a cathode ray tube with a graphic arts quality comprising a camera having a plurality of lenses arranged in a side by side array, film positioned to receive adjacent to one another the images formed by each lens of said array of lenses in side by side position, means for positioning said array of lenses so that each produces an image of said cathode ray tube face on said film, shutter means in said camera for successively exposing the image produced by each lens to said film, means for synchronizing the operation of said shutter means for successively exposing the image of successive lenses responsive to successive image displays across the face of said cathode ray tube, and means for advancing said film at the termination of the exposure of the image of last of produced by the said lenses in said array to said film to present an unexposed region of said film to said array of lenses.

5. Apparatus as recited in claim 4 wherein each of said lenses in said array produce a magnification of the image of said cathode ray tube face.

6. A system for photographing on film a line of data which is displayed on the face of the cathode ray tube, comprising means for successively displaying portions of said line of data in a line across the face of said cathode ray tube, a camera having a plurality of enlarging lenses positioned adjacent one another, there being as many lenses in said plurality as there are portions of said line, each line forming an image of the entire display across the face of said cathode ray tube, said film being positioned behind said lenses to record in continuous side by side relationship the images provided by said lenses, shutter means for successively exposing said film to the image provided by successive ones of said plurality of enlarging lenses, means for synchronizing operation of said shutter means with operation of said means for successively displaying portions of said line of data, and means for advancing said film after it has been exposed to images from all of said lenses to provide a fresh region thereof for exposure to the images of said lenses.

7. A system as recited in claim 6 wherein said shutter means comprises a focal plane shutter having an opening therein just large enough to pass the image formed by a lens, and means for moving said focal plane shutter to successively pass said opening by said lenses.

References Cited
UNITED STATES PATENTS

| | | | |
|---|---|---|---|
| 2,941,033 | 6/1960 | Fromm | 178—7.1 |
| 2,967,906 | 1/1961 | Blake | 178—7.1 |

DAVID G. REDINBAUGH, *Primary Examiner.*

H. W. BRITTON, *Assistant Examiner.*